United States Patent [19]

Hunt

[11] Patent Number: 4,615,650
[45] Date of Patent: Oct. 7, 1986

[54] LOCKING PIN FOR A TOOL HOLDER
[75] Inventor: Carl E. Hunt, Milford, Mich.
[73] Assignee: GTE Valeron Corporation, Troy, Mich.
[21] Appl. No.: 787,135
[22] Filed: Oct. 15, 1985
[51] Int. Cl.⁴ .............................. B23B 27/16
[52] U.S. Cl. ................................... 407/105
[58] Field of Search ................ 407/103, 104, 105

[56] References Cited

U.S. PATENT DOCUMENTS

| | | | |
|---|---|---|---|
| 3,491,421 | 1/1970 | Holloway | 407/105 |
| 3,908,255 | 9/1975 | Faber | 407/105 |
| 4,398,853 | 8/1983 | Erickson | 407/104 |
| 4,430,031 | 2/1984 | Hellstrom | 407/104 |

FOREIGN PATENT DOCUMENTS

| | | | |
|---|---|---|---|
| 2726802 | 12/1977 | Fed. Rep. of Germany | 407/105 |
| 2448403 | 10/1980 | France | 407/105 |
| 704727 | 12/1979 | U.S.S.R. | 407/105 |

Primary Examiner—Francis S. Husar
Assistant Examiner—Jerry Kearns
Attorney, Agent, or Firm—Witherspoon & Hargest

[57] ABSTRACT

A tool holder, and a locking pin for use therewith, of the type having a recess into which a cutting insert is removeably secured by passing the locking pin through a bore in the insert and into a bore in the tool holder.

16 Claims, 6 Drawing Figures

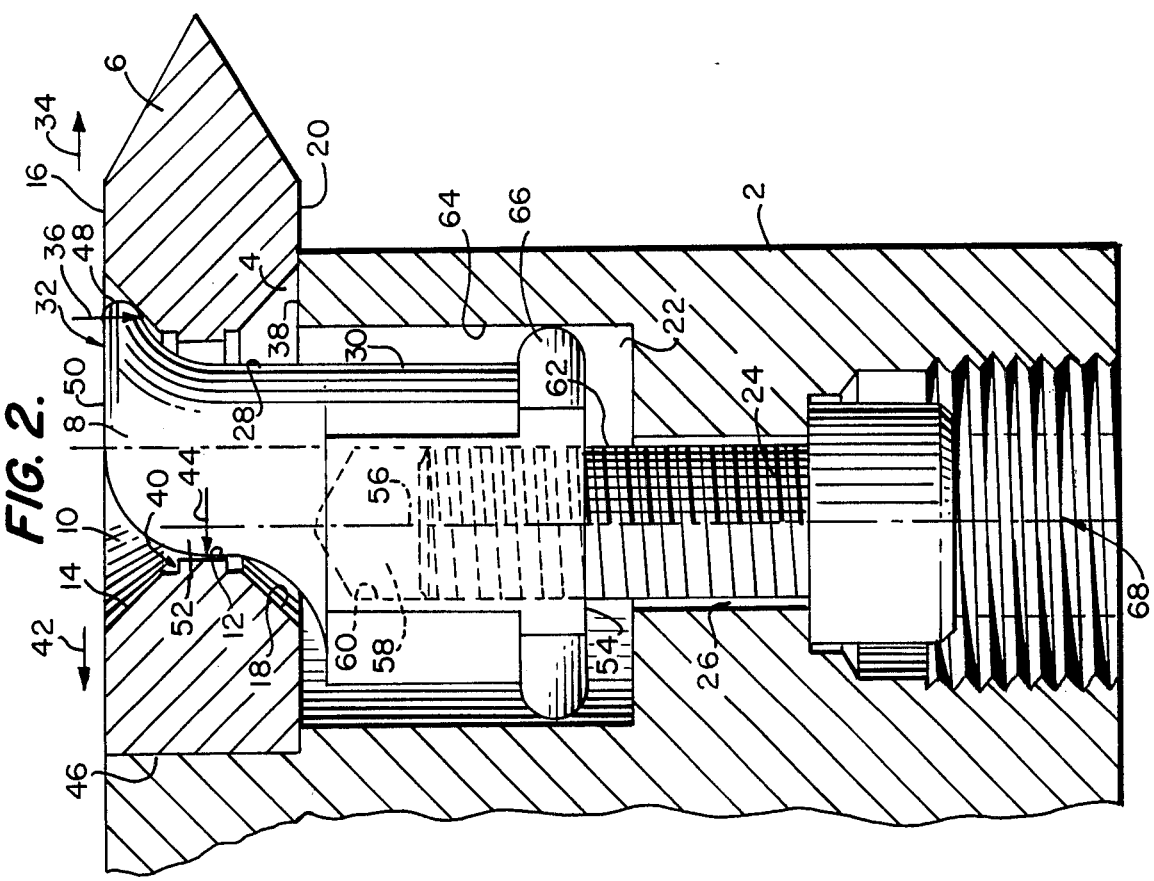
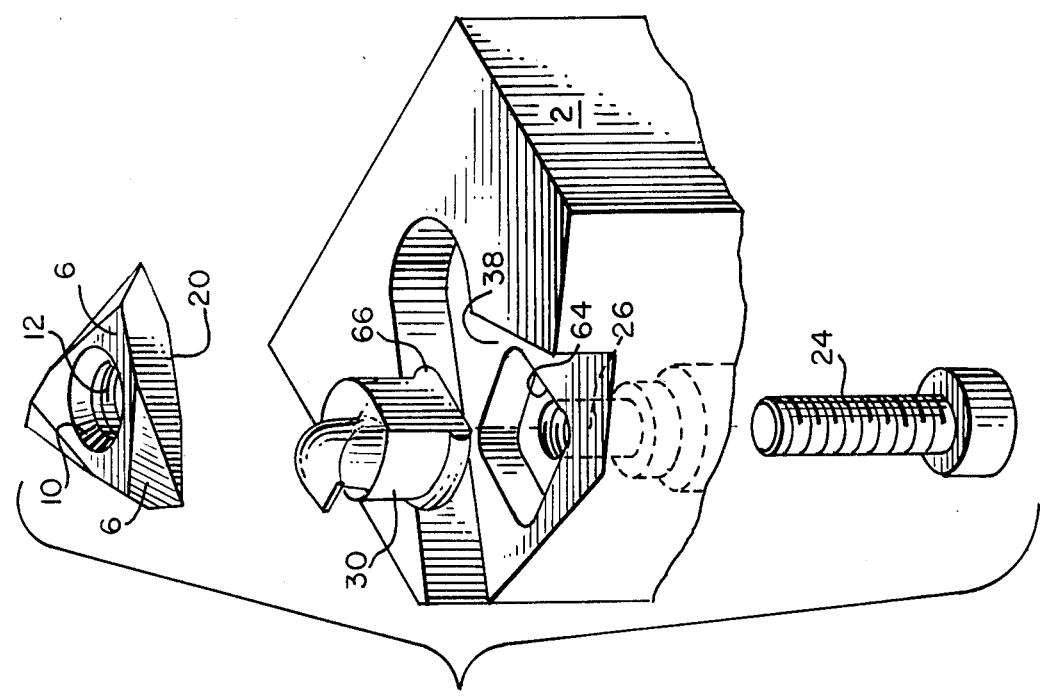

LOCKING PIN FOR A TOOL HOLDER

BACKGROUND OF THE INVENTION

1. Field of the Invention

The present invention is related to a tool holder of the type having a recess into which a cutting insert is removably secured by means of a locking pin which extends through the cutting insert and into the tool holder.

The present invention is also related to the locking pin for use with such a tool holder.

2. Description of the Prior Art

Presently, it is known to use a clamping pin to hold a cutting insert in place relative to a recess provided in a tool holder. For example, one known apparatus is described in U.S. Pat. No. 3,490,117 to Hertel. The tool holder described in this patent includes a clamping pin which must be removed from the holder in order to index or remove the cutting insert from the holder. Such an operation is time consuming and involves the existence of a loose part which could be lost or inadvertently discarded during the changing of a cutting insert. It is an object of this invention to provide a tool holder wherein the cutting tool can be indexed or replaced without removal of the locking or clamping pin. The clamping pin described in Hertel includes a thickened head which bears against a countersunk portion of the bore wall extending through the cutting insert to hold the insert in place. However, the compressive forces exerted by the thickened head against the insert are not specifically identified as providing specific orientation relative to the tool holder surfaces against which the cutting insert is to be held. It is a further object of this invention to provide a tool holder wherein the locking pin includes means to positively press the cutting insert against at least two surfaces of the tool holder recess. In particular, the locking pin will positively press the cutting insert downward into the recess and simultaneously positively press the cutting insert backward into the recess, the downward pressure being near the front of the recess to provide the greatest moment of force to prevent the cutting insert from lifting from the recess. Another object of this invention includes providing a tool holder having the foregoing objects and wherein the locking pin does not project above the outer face of the insert. Yet a further object of this invention is to provide a tool holder of the type described herein requiring a minimum amount of movement to lock the cutting insert in place. It is also an object to provide a locking pin useful in accomplishing the objects described above wherein the pin can be used with standard cutting inserts used in operations such as threading, grooving, turning and boring.

SUMMARY OF THE INVENTION

This invention achieves these and other results by providing a locking pin for use with a tool holder of the type having a recess into which a cutting insert is removably secured by passing the locking pin through a cutting insert bore having a bore wall, which extends from a first countersunk portion of an outer face of the cutting insert to an inner face of the cutting insert, and into a first bore of the tool holder. The cutting insert is caused to be pressed into the recess by a drawing member which extends through a second bore of the tool holder and engages the locking pin. The locking pin includes a first portion which is dimensioned for insertion through the cutting insert bore and a second adjacent opposite portion which is dimensioned for insertion into the first bore of the tool holder. First means are provided which protrude from the first portion in a first direction for exerting a first positive locking pressure in a first direction against the countersunk portion of the cutting insert bore at the outer insert face so that the cutting insert can be pressed against one face of the tool holder recess. Second means are provided which protrude from the first portion in a second direction perpendicular to the first direction for exerting a second positive locking pressure in a second direction against the bore wall of the cutting insert bore so that the cutting insert can be pressed against another face of the recess. Third means are provided in the form of a surface area of the second portion for engagement with the drawing member so that the locking pressures can be exerted in the first and second directions.

BRIEF DESCRIPTION OF THE DRAWINGS

FIG. 1 is an exploded view of one embodiment of the present invention;

FIG. 2 is a sectional view of the embodiment of FIG. 1 when assembled;

DESCRIPTION OF THE PREFERRED EMBODIMENTS

Figure 3:
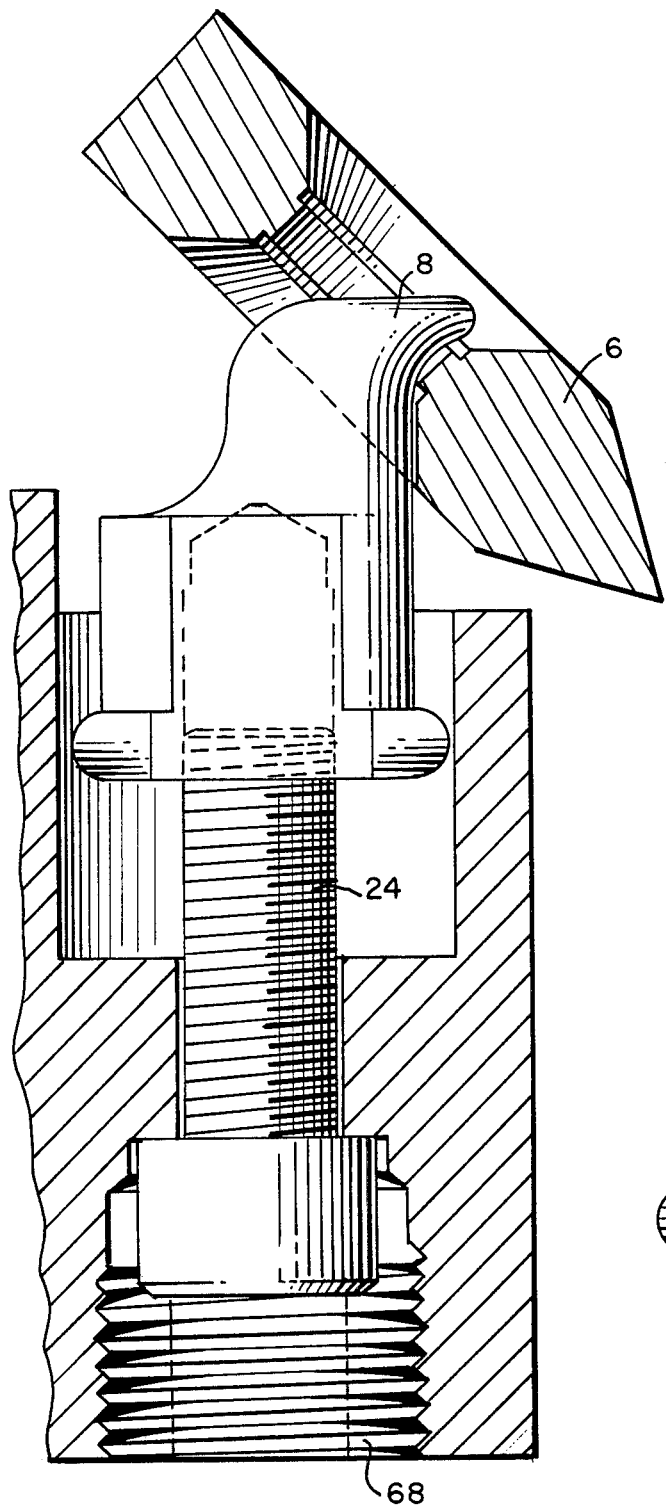
FIG. 3 is the same view as FIG. 2 except depicting the removal of a cutting insert.

The embodiment of this invention which is illustrated in FIGS. 1 and 2 is particularly suited for achieving the objects of this invention. FIGS. 1 and 2 depict a tool holder 2 of the type having a recess 4 into which a cutting insert 6 is removably secured. Cutting insert 6 can be any cutting insert used in operations such as threading, grooving, turning and boring wherein the insert is secured by passing a locking pin 8 through a cutting insert bore 10 having a bore wall 12 which extends from a first countersunk portion 14 of an outer face 16 of cutting insert 6 to, for example, a second countersunk portion 18 of an inner face 20. Pin 8 extends into a first bore 22 of the tool holder 2. The cutting insert 6 is drawn into recess 4 by a drawing member 24 which extends through a second bore 26 of tool holder 2 and engages the locking pin 8.

The locking pin 8 includes a first portion 28 dimensioned for insertion through the cutting insert bore 10 and a second adjacent portion 30 dimensioned for insertion into the first bore 22. First means generally designated 32 protrudes from the first portion 28 in a first direction designated by arrow 34 for exerting a first positive locking pressure in a first direction designated by arrow 36 against the countersunk portion 14 of the cutting insert bore 10 at the outer face 16 so that the cutting insert can be pressed downward into the recess against one face 38 thereof. In the embodiment of FIGS. 1 and 2, the locking pressure designated by arrow 36 is near the front of the recess to provide the greatest moment of force to prevent the cutting insert from lifting from the recess as might tend to occur in operations such as, for example, left hand threading.

The locking pin 8 also includes second means generally designated 40 which protrudes from the first portion 28 in a second direction designated by arrow 42 perpendicular to the first direction for exerting a second positive locking pressure in a second direction designated by arrow 44 against the bore wall 12 so that the cutting insert can be pressed backward against another face 46 of recess 4. In the embodiments described herein the first locking pressure is perpendicular to outer face 16 and the second locking pressure is parallel to outer face 16.

As noted herein, the first portion 28 is dimensioned for insertion through the cutting insert bore 10. However, by providing protruding means 32 and 40, the outer end of first portion 28 is somewhat enlarged relative to the remaining extent thereof for bearing against insert 6 to hold the insert in place as described herein. At the same time, such outer end does not project beyond the outer face 16 of the insert 6. To this end, first means 32 comprises a lip 48 which extends from first portion 28 at a first end 50 of the pin 8, and second means 40 comprises a raised area 52 of the first portion 28 located between the first end 50 and second end 54 of pin 8, the first end 50 lying substantially in the same plane as the outer face 16 so that the locking pin does not project above such outer face.

Means are provided associated with a surface area of the second portion 30 for engagement with the drawing member 24 so that the locking pressures can be exerted in the first direction 36 and the second direction 44. For example, the second portion includes an axis 56 extending from the second end of pin 8 towards the first portion 28, and the engagement means includes a pocket 58 extending into the second portion 30. In the embodiment of FIGS. 1 and 2, pocket 58 extends along axis 56 and is defined by a cylindrical wall 60 having threads 62. In this embodiment, the drawing member 24 is a bolt which is threaded into pocket 58 by threads 62. By tightening bolt 24 into pocket 58 the pin 8 is pulled further into first bore 22 so that locking pressure is exerted in first direction 36 and second direction 44 as the lip 48 is drawn against countersunk portion 14 and the raised area 52 is drawn against the bore wall 12 to cause the cutting insert to be drawn into recess 4 against faces 38 and 46, respectively. By loosening bolt 24, the pin 8 is caused to be raised from first bore 22 so that the locking pressures are relieved. In this manner the cutting insert 6 can be removed from, or indexed relative to, the pin 8 without removing the pin or other hardware from the apparatus. This operation is shown in FIG. 3.

Figure 4:
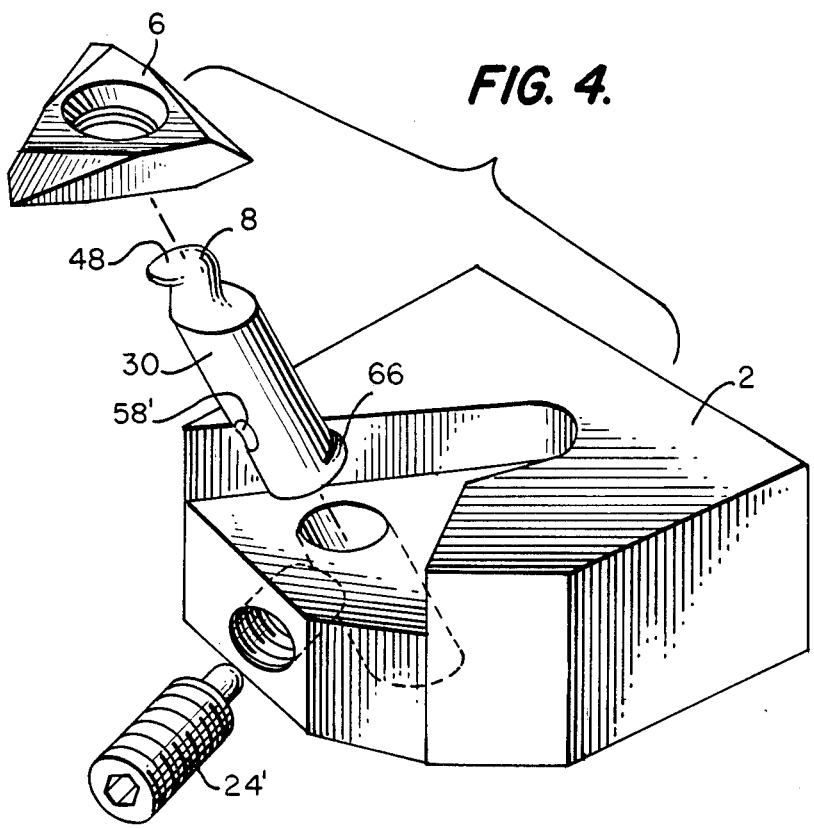
FIG. 4 is an exploded view of another embodiment of the present invention.
Figure 5:
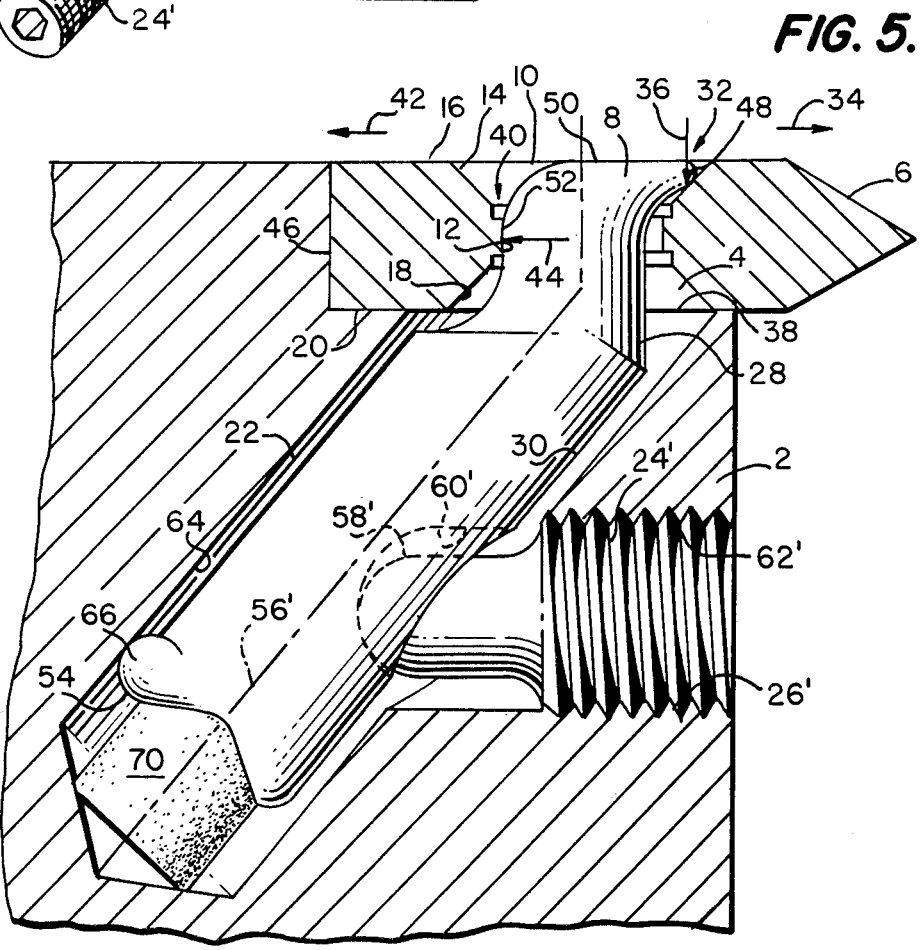
FIG. 5 is a sectional view of the embodiment of FIG. 4 when assembled.

In the modified embodiment of FIGS. 4 and 5, like structural features have been assigned reference numbers which correspond to the reference numbers of FIGS. 1 and 2. However, the embodiment of FIGS. 4 and 5 differs from that of FIGS. 1 and 2 in that in FIGS. 4 and 5 the engagement means includes a pocket 58' which extends into the second portion 30 at an angle relative to the axis 56' and is defined by a wall 60' which is preferably cup-shaped. In the preferred embodiment, the cup shaped wall 60' is substantially parallel to the direction 44 of the second positive locking pressure. In this embodiment, the drawing member 24' is in the form of a set pin one end of which is threaded into second bore 26' by threads 62' and the other end of which extends into the pocket 58' and is preferably rounded to bear against the cup-shaped wall 60'. By tightening the set pin, the set pin is urged against wall 60' thereby pushing the pin 8 further into the first bore 22 so that locking pressure is exerted in first direction 36 and second direction 44 as the lip 48 is drawn against countersunk portion 14 and the raised area 52 is drawn against the bore wall 12 to cause the cutting insert to be drawn into recess 4 against faces 38 and 46, respectively. By loosening the set pin 24' the locking pressures are relieved as noted herein regarding the embodiment of FIGS. 1 and 2.

In the embodiments described herein, a minimum amount of movement required to remove or lock the cutting insert. For example, the number of turns of the bolt 24 or set pin 24' required to remove or lock the insert can be greatly reduced merely by controlling the threads per inch.

In the embodiments described herein, the second portion 30 of pin 8 comprises means extending therefrom for engaging a wall 64 of the first bore 22 so that movement of the second portion of the pin relative to the first bore is facilitated by a reduction in friction therebetween. In other words, such engaging means serves to direct the pin 8 during insertion into or removal from first bore 22 with a minimum amount of contact between the pin and bore wall 64. Such engaging means are depicted as comprising a raised area 66 of the second portion 30 of the pin. In the embodiment described herein movement of the pin 8 relative to the first bore 22 is further facilitated when pin 8 is to be raised to allow for removal or indexing of the insert. For example, in the embodiment of FIGS. 1 and 2 a hollow set screw 68 is provided to prevent axial movement of bolt 24 when bolt 24 is tightened or loosened. By holding the bolt in place in this manner, tightening or loosening of the bolt will lower or raise pin 8, respectively. In the embodiment of FIGS. 4 and 5, the raising of pin 8 is facilitated by providing a spring which urges pin 8 out of bore 22 when the set pin 24' is loosened. For example, the spring can be in the form of a silicone rubber material 70 which is compressed when pin 8 is locked in place and which expands when the set pin 24' is loosened.

Figure 6:
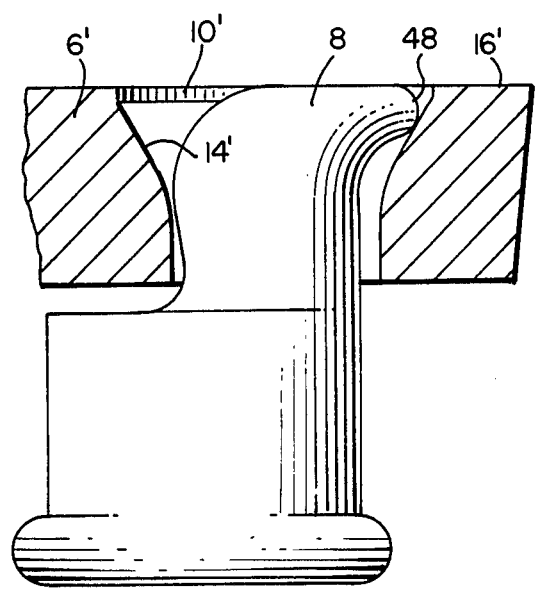
FIG. 6 is a view of another embodiment of the present invention.

In the embodiments depicted in FIGS. 1 through 5, countersunk portion 14 is depicted as a typical countersink at outer surface 16. However, it should be understood that the term countersunk is not to be so limited but is meant to be used in its broadest context to include configurations wherein the portion 14 is a funnel-like enlargement at the outer end of the cutting insert bore 10. For example, in the embodiment of FIG. 6, the locking pin 8 is used with a cutting insert 6' having an industry standard ISO configuration. In particular, the countersunk portion of the insert bore 10' includes a generally curved wall 14', as depicted in the drawing, which is generally funnel-shaped and against which the lip 48 of the pin bears as described herein. Although shown as being partially recessed relative to outer surface 16', curved wall 14' can be designed to extend to the outer surface 16', if desired.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A locking pin for use with a tool holder of the type having a recess into which a cutting insert is removably secured by passing said locking pin through a cutting insert bore having a bore wall, which extends from a first countersunk portion of an outer face of said cutting insert to an inner face of said cutting insert, and into a first bore of said tool holder, and wherein said cutting insert is caused to be pressed into said recess by a drawing member which extends through a second bore of said tool holder and engages said locking pin, said locking pin comprising:

a first portion being dimensioned for insertion through said cutting insert bore;

a second adjacent portion being dimensioned for insertion into said first bore;

first means protruding from said first portion in a first direction for exerting a first positive locking pressure in a first direction against said countersunk portion of said cutting insert bore at said outer face, so that said cutting insert can be pressed downward against one face of said recess;

second means protruding from said first portion in a second direction perpendicular to said first direction, for exerting a second positive locking pressure in a second direction against said bore wall so that said cutting insert can be pressed backward against another face of said recess; and, third means in the form of a surface area of said second portion for engagement with said drawing member so that said locking pressures can be exerted in said first and second directions.

2. The locking pin of claim 1 wherein said first means comprises a lip which extends from said first portion at a first end of said pin and wherein said second means comprises a raised area of said first portion located between said first end and a second end of said pin.

3. The locking pin of claim 2 wherein said second portion includes an axis extending from said second end towards said first portion and wherein said engagement means comprises a pocket extending into said second portion.

4. The locking pin of claim 3 wherein said pocket extends along said axis.

5. The locking pin of claim 3 wherein said second portion comprises means extending therefrom for engaging a wall of said first bore so that insertion of said second portion into said first bore is facilitated by a reduction in friction therebetween.

6. The locking pin of claim 5 wherein said engaging means comprises a raised area of said second portion.

7. A tool holder of the type having a recess into which a cutting insert is removably secured by passing a locking pin through a cutting insert bore having a bore wall, which extends from a first countersunk portion of an outer face of said cutting insert to an inner face of said cutting insert, and into a first bore of said tool holder, and wherein said cutting insert is caused to be pressed into said recess by a drawing member which extends through a second bore of said tool holder and engages said locking pin, the improvement comprising a locking pin having a first portion dimensioned for insertion through said cutting insert bore; a second adjacent portion dimensioned for insertion into said first bore; first means protruding from said first portion in a first direction for exerting a first positive locking pressure in a first direction against said countersunk portion of said cutting insert bore at said outer face, so that said cutting insert can be pressed downward against one face of said recess; second means protruding from said first portion in a second direction perpendicular to said first direction, for exerting a second positive locking pressures in a second direction against said bore wall so that said cutting insert can be pressed backward against another face of said recess; and, third means in the form of a surface area of said second portion for engagement with said drawing member so that said locking pressures can be exerted in said first and second directions.

8. The tool holder of claim 7 wherein said first means comprises a lip which extends from said first portion at a first end of said pin and wherein said second means comprises a raised area of said first portion located between said first end and a second end of said pin.

9. The tool holder of claim 8 wherein said second portion includes an axis extending from said second end towards said first portion and wherein said engagement means comprises a pocket extending into said second portion.

10. The tool holder of claim 9 wherein said pocket extends along said axis.

11. The tool holder of claim 9 wherein said second portion comprises means extending therefrom for engaging a wall of said first bore so that insertion of said second portion into said first bore is facilitated by a reduction in friction therebetween.

12. The tool holder of claim 11 wherein said engaging means comprises a raised area of said second portion.

13. A locking pin for use with a tool holder of the type having a recess into which a cutting insert is removably secured by passing said locking pin through a cutting insert bore having a bore wall, which extends from a first countersunk portion of an outer face of said cutting insert to an inner face of said cutting insert, and into a first bore of said tool holder, and wherein said cutting insert is caused to be pressed into said recess by a set pin which extends through a second bore of said tool holder and engages said locking pin, said locking pin having a first end and a second end and comprising:

a first portion being dimensioned for insertion through said cutting insert bore;

a second adjacent portion being dimensioned for insertion into said first bore and including an axis which extends from said second end towards said first portion;

first means in the form of a lip which extends from said first portion at said first end of said pin in a first direction for exerting a first positive locking pressure in a first direction against said countersunk portion of said cutting insert bore at said outer face, so that said cutting insert can be pressed against one face of said recess;

second means in the form of a raised area of said first portion located between said first end and said second end of said pin and protruding from said first portion in a second direction perpendicular to said first direction, for exerting a second positive locking pressure in a second direction against said bore wall so that said cutting insert can be pressed against another face of said recess; and, third means in the form of a pocket extending said second portion at an angle relative to said axis for engagement with said drawing member so that said locking pressures can be exerted in said first and second directions.

14. The locking pin of claim 13 wherein said pocket is defined by a cylindrical wall and wherein said wall is threaded.

15. A tool holder of the type having a recess into which a cutting insert is removably secured by passing a locking pin through a cutting insert bore having a bore wall, which extends from a first countersunk portion of an outer face of said cutting insert to an inner face of said cutting insert, and into a first bore of said tool holder, and wherein said cutting insert is caused to be pressed into said recess by a drawing member which extends through a second bore of said tool holder and engages said locking pin, the improvement comprising a locking pin having a first end and a second end and having a first portion dimensioned for insertion through said cutting insert bore; a second adjacent portion dimensioned for insertion into said first bore and including an axis which extends from said second end towards said first portion; first means in the form of a lip which extends from said first portion at said first end of said pin in a first direction for exerting a first positive locking pressure in a first direction against said countersunk portion of said cutting insert bore at said outer face, so that said cutting insert can be pressed against one face of said recess; second means in the form of a raised area of said first portion located between said first end and said second end of said pin and protruding from said first portion in a second direction perpendicular to said first direction, for exerting a second positive locking pressure in a second direction against said bore wall so that said cutting insert can be pressed against another face of said recess; and, third means in the form of a pocket extending into said second portion at an angle relative to said axis for engagement with said drawing member so that said locking pressures can be exerted in said first and second direction.

16. The tool holder of claim 15 wherein said pocket is defined by a cylindrical wall and wherein said wall is threaded.

* * * * *